US008330752B2

(12) United States Patent
Enjou

(10) Patent No.: US 8,330,752 B2
(45) Date of Patent: Dec. 11, 2012

(54) DATA LINE DRIVING CIRCUIT, DRIVER IC AND DISPLAY APPARATUS

(75) Inventor: Hiroyasu Enjou, Shiga (JP)

(73) Assignee: RENESAS Electronics Corporation, Kawasaki-shi, Kanagawa (JP)

( * ) Notice: Subject to any disclaimer, the term of this patent is extended or adjusted under 35 U.S.C. 154(b) by 909 days.

(21) Appl. No.: 12/314,490

(22) Filed: Dec. 11, 2008

(65) Prior Publication Data

US 2009/0167745 A1 Jul. 2, 2009

(30) Foreign Application Priority Data

Dec. 26, 2007 (JP) ................................. 2007-335042

(51) Int. Cl.
*G06F 3/038* (2006.01)
*G09G 5/00* (2006.01)

(52) U.S. Cl. .......................................... 345/211; 345/98

(58) Field of Classification Search .............. 345/84–99, 345/204; 326/87; 327/108; 330/255, 285
See application file for complete search history.

(56) References Cited

U.S. PATENT DOCUMENTS 6,411,162 B2 * 6/2002 Minamizaki et al. .......... 330/255
6,496,175 B1 * 12/2002 Fukuo ............................. 345/99
6,759,906 B2 * 7/2004 Matsunaga et al. ........... 330/285
6,850,232 B2 * 2/2005 Tazuke ........................... 345/204
7,173,458 B2 * 2/2007 Yonezawa ...................... 327/108
7,808,468 B2 10/2010 Son et al.
2007/0008009 A1 * 1/2007 Son et al. ......................... 326/87
2008/0259017 A1 * 10/2008 Wright et al. ................... 345/94

FOREIGN PATENT DOCUMENTS

CN 1892799 A 1/2007
JP 7-318897 A 12/1995
JP 2005-215007 8/2005

OTHER PUBLICATIONS

Chinese Office Action dated Dec. 1, 2011, with English translation.
Japanese Notification for Reasons for Refusal dated May 17, 2012, with partial English-language translation.

* cited by examiner

*Primary Examiner* — Chanh Nguyen
*Assistant Examiner* — James Nokham
(74) *Attorney, Agent, or Firm* — McGinn IP Law Group, PLLC

(57) ABSTRACT

A data line driving circuit for a display panel includes a plurality of output circuits, a bias circuit, and a plurality of switches. Each of the plurality of output circuits includes an electric current source which supplies electric current in response to a bias signal, and supplies a data voltage by using the electric current to a corresponding one of a plurality of data lines arranged in the display panel. The bias circuit generates the bias signal, and supplies the bias signal to the plurality of output circuits through bias wirings. The plurality of switches is provided between the bias circuit and the plurality of output circuits, and cuts off the bias wirings in response to a control signal.

17 Claims, 7 Drawing Sheets

UN-USED OUTPUTS
202~279
120a
120b
120c
311
310
480
402
201
280
1
301
350

Fig. 5

| OUTPUT NUMBER | SW1 | SW2 | SW3 | SW4 | SW5 | SW6 |
|---|---|---|---|---|---|---|
| 804 | ON | ON | ON | ON | ON | ON |
| 768 | ON | ON | OFF | OFF | ON | ON |
| 720 | ON | OFF | OFF | OFF | OFF | ON |
| 684 | OFF | OFF | OFF | OFF | OFF | OFF |

DATA LINE DRIVING CIRCUIT, DRIVER IC AND DISPLAY APPARATUS

INCORPORATED BY REFERENCE

This application is based upon and claims the benefit of priority from Japanese patent application No. 2007-335042 filed on Dec. 26, 2007, the disclosure of which is incorporated herein in its entirety by reference.

BACKGROUND OF THE INVENTION

1. Field of the Invention

The present invention relates to a data line driving circuit, a driver IC including the data line driving circuit, and a display apparatus operated by the driver IC.

2. Description of Related Art

A flat panel display, such as a liquid crystal display apparatus, an organic EL (Electro Luminescence) display and the like has become popular. The liquid crystal display apparatus is used for a display apparatus in various fields, such as a display apparatus of a television set, a display apparatus of a personal computer, a displaying apparatus of a digital camera, and a display apparatus of a cellular phone and the like. Also, the organic EL display is considered to be a promising apparatus as a next generation display apparatus and used in the displaying apparatus of the cellular phone and the display mounted in a car, and the like. The flat panel display includes a driver IC. The driver IC is used as a circuit which drives a displaying element and controls displaying a picture.

The flat panel display typically includes a displaying region, which includes a plurality of pixels arranged in a matrix shape. The driver IC controls light from the respective pixels to execute displaying a picture on the displaying region. Each pixel includes a displaying element such as a liquid crystal material, an organic EL element or the like. Each displaying element is controlled by a signal from the driver IC.

For example, in the display apparatus of the personal computer, a picture signal supplied from a main body of the personal computer is received by a controller LSI mounted in the display apparatus. The controller LSI supplies a digital signal corresponding to the picture signal to the driver IC. The driver IC generates an analog signal based on the obtained digital signal and outputs it to the respective pixels arrayed in the matrix shape. In accordance with this, the displaying element of each pixel is controlled, and the picture is displayed inside the displaying region.

Typically, the number of outputs (hereinafter referred to as output number) of the driver IC is fixed. Thus, in a case that the number of pixel columns (the number of dot columns) is not equal to the integral multiple of the output number of the driver IC, a countermeasure is conventionally employed in which several kinds of the driver ICs whose output numbers differ from each other are used at the same time. However, when the several kinds of the driver ICs whose output numbers differ from each other are used at the same time, electric properties such as driving performances of those driver ICs are different from each other. Hence, there is a case that variation in display quality occurs between the different driver ICs. In order to suppress a drop of the display quality, a technique is disclosed which can change the output number of the driver IC in Japanese Laid-Open Patent Application JP-P2005-215007A.

FIG. 1 is a block diagram showing source driver ICs 120 and their output wirings disclosed in JP-P2005-215007A. In FIG. 1, a region (displaying region 301) surrounded with a dash line is provided with a plurality of pixels and serves as a displaying region in which a picture is displayed. In the technique disclosed in JP-P2005-215007A, the displaying region 301 is used for displaying a picture of 454 dots×RGB (=1362 pixel columns). Specifically, an example is shown in which the output number of a central source driver IC 120*b* is 402 and each of the output numbers of the other two source driver ICs 120*a* and 120*c* of both ends is 480 among the three source driver ICs 120*a*, 120*b* and 120*c*. In this case, the total output number is 1362 (480+402+480).

As shown in FIG. 1, each of the source driver ICs 120*a* to 120*c* includes an output number control terminal 311, in addition to a plurality of display signal output terminals 310. Control signals (TEST1, TEST1B) 350 from a control circuit 105 (not shown) are supplied to the output number control terminals 311, respectively. In this example, the control signals (TEST1, TEST1B) 350 serving as the inputs to the respective output number control terminals 311 are kept constant, and the output numbers are kept constant. For example, when the control signals (TEST1, TEST1B) 350 of an L-level are supplied to the central source driver IC 120*b*, the output number can be set to 402, and when the control signals (TEST1, TEST1B) 350 of an H-level are supplied to the source driver ICs 120*a* and 120*c* of both ends, the output numbers can be set to 480.

In this way, the respective source driver ICs 120*a*, 120*b* and 120*c* switch between the 480 outputs and the 402 outputs, based on the control signals (TEST1, TEST1B) 350 supplied to the output number control terminals 311.

We have now discovered following facts. JP-P2005-215007A does not describe a specific configuration used for switching the output numbers of the driver ICs. In addition, these driver ICs cannot stop electric current, which becomes unnecessary, flowing into outputs when the output numbers are switched. Cutting the unnecessary electric current flowing into the outputs leads to a reduction in electric current consumption. Thus, this is one of the important electric properties that are always required for the driver IC.

SUMMARY

The present invention seeks to solve one or more of the above problems, or to improve upon those problems at least in part.

In one embodiment, a data line driving circuit for a display panel includes: a plurality of output circuits each configured to include an electric current source which supplies electric current in response to a bias signal, and supply a data voltage by using the electric current to a corresponding one of a plurality of data lines arranged in the display panel; a bias circuit configured to generate the bias signal, and supply the bias signal to the plurality of output circuits through bias wirings; and a plurality of switches configured to be provided between the bias circuit and the plurality of output circuits, and cut off the bias wirings in response to a control signal.

In another embodiment, a driver circuit includes: a data line driving circuit configured to drive a plurality of data lines arranged in a display panel, wherein the data line driving circuit includes: a plurality of output circuits each configured to include an electric current source which supplies electric current in response to a bias signal, and supply a data voltage by using the electric current to a corresponding one of the plurality of data lines; a bias circuit configured to generate the bias signal, and supply the bias signal to the plurality of output circuits through bias wirings; and a plurality of switches configured to be provided between the bias circuit and the plurality of output circuits, and cut off the bias wirings in response to a control signal.

In another embodiment, a display apparatus includes: a display panel configured to include a plurality of pixels arranged in a matrix shape; and a data line driving circuit configured to drive a plurality of data lines arranged in the display panel, wherein the data line driving circuit includes: a plurality of output circuits each configured to include an electric current source which supplies electric current in response to a bias signal, and supply a data voltage by using the electric current to a corresponding one of the plurality of data lines; a bias circuit configured to generate the bias signal, and supply the bias signal to the plurality of output circuits through bias wirings; and a plurality of switches configured to be provided between the bias circuit and the plurality of output circuits, and cut off the bias wirings in response to a control signal.

In the present invention, by using the plurality of switches turned on and off in response to the control signal, the output number of the data line driving circuit can be changed to a desirable output number.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 5 is a table exemplifying a relation between states of a first to sixth switches SW1 to SW6 and the output numbers in the embodiment;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
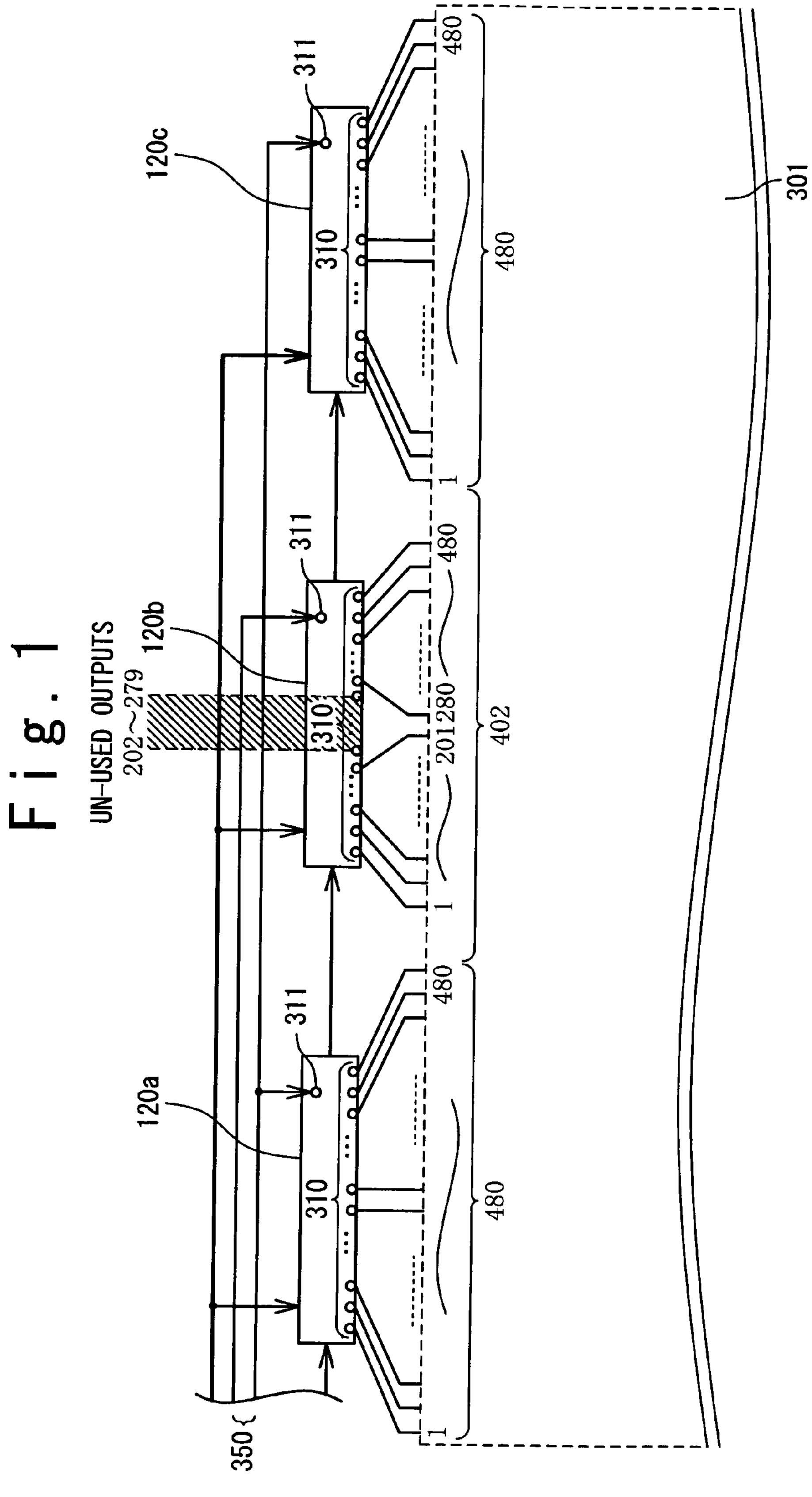
FIG. 1 is a block diagram showing source driver ICs and their output wirings disclosed in JP-P2005-215007A.
Figure 2:
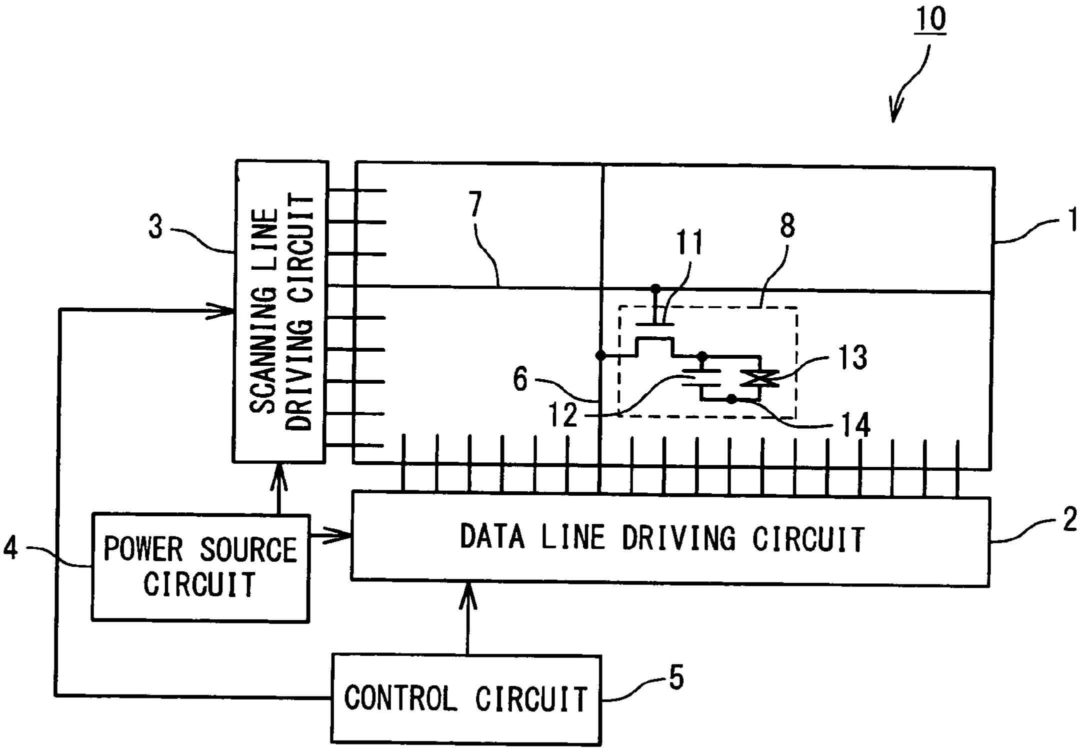
FIG. 2 is a block diagram exemplifying a configuration of a liquid crystal displaying apparatus in an embodiment according to the present invention.

The embodiment according to the present invention will be described below with reference to the drawings. FIG. 2 is a block diagram exemplifying a configuration of a liquid crystal display apparatus in this embodiment. The liquid crystal display apparatus 10 includes a liquid crystal display panel 1, a data line driving circuit 2, a scanning line driving circuit 3, a power source circuit 4 and a control circuit 5.

The liquid crystal display panel 1 includes: data lines 6 that are laterally arrayed and longitudinally extended on the drawing; and scanning lines 7 that are longitudinally arrayed and laterally extended on the drawing. Also, The liquid crystal display panel 1 includes a plurality of pixels 8 arranged in a matrix shape. Each of the plurality of pixels 8 is arranged near each of intersections between the plurality of data lines 6 and the plurality of scanning lines 7. Each of the plurality of pixels 8 includes a TFT (Thin Film Transistor) 11, a pixel capacitor 12 and a liquid crystal element 13. The gate of the TFT 11 is connected to the scanning line 7. The source (drain) of the TFT 11 is connected to the data line 6. Also, the drain (source) of the TFT 11 is connected to the pixel capacitor 12 and the liquid crystal element 13. The pixel capacitor 12 and the liquid crystal element 13 are connected through a node 14 to a common electrode (not shown).

The data line driving circuit 2 outputs signal voltages based on display data and drives the plurality of data lines 6. The scanning line driving circuit 3 outputs selection/non-selection voltages of the TFTs 11 and drives the plurality of scanning lines 7. The control circuit 5 controls timings of driving by the scanning line driving circuit 3 and the data line driving circuit 2. The power source circuit 4 generates the signal voltages outputted by the data line driving circuit 2 and the selection/non-selection voltages outputted by the scanning line driving circuit 3, and supplies them to the respective driving circuits.

Figure 3:
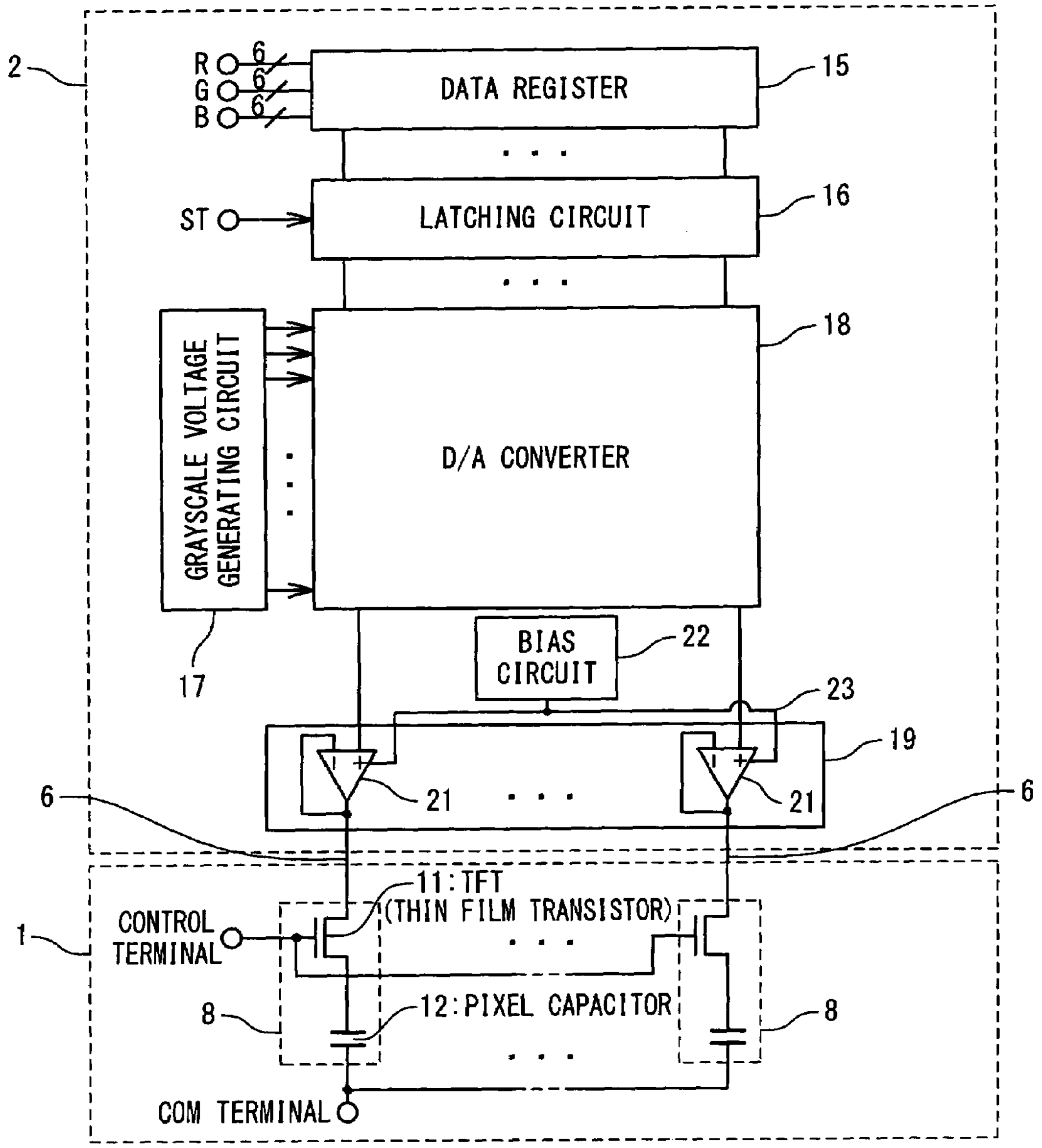
FIG. 3 is a block diagram showing a configuration of a data line driving circuit 2 in the embodiment.

The configuration of the data line driving circuit 2 will be described below. FIG. 3 is a block diagram showing a configuration of the data line driving circuit 2 in this embodiment. In this embodiment, it is assumed that the display signal treated by the data line driving circuit 2 is a 6-bit digital display signal. The data line driving circuit 2 includes: a data register 15; a latching circuit 16; a D/A converter 18; a grayscale voltage generating circuit 17; and an output amplifier 19. The data register 15 captures display signals R, G, B from outside. The latching circuit 16 latches a 6-bit digital signal in synchronization with a strobe signal ST. The D/A converter 18 is composed of digital/analog converters of parallel N stages. The grayscale voltage generating circuit 17 has a gamma conversion property matched with a property of the liquid crystal. The output amplifier 19 includes N number of output buffers 21 (voltage followers). Each of the N number of output buffers 21 supplies a voltage from the D/A converter 18 to the data line 6. The plurality of output buffers 21 included in the output amplifier 19 is connected through bias wirings 23 to a bias circuit 22. The bias circuit 22 outputs a bias voltage to the plurality of output buffers 21.

Figure 4:
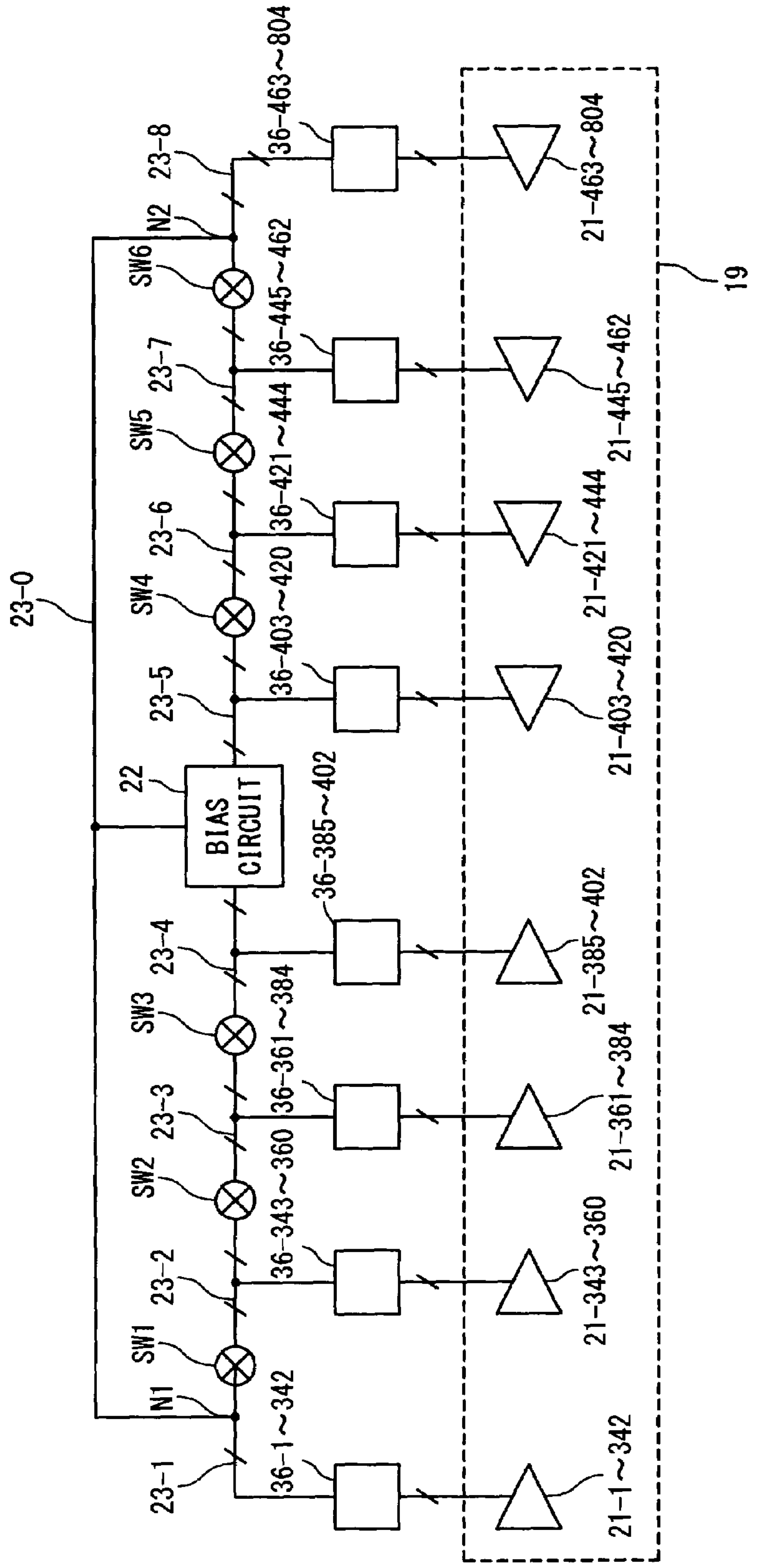
FIG. 4 is a block diagram exemplifying a detailed configuration of a bias circuit and related circuits in the embodiment.

FIG. 4 is a block diagram exemplifying detailed configurations of the bias circuit 22 and related circuits in this embodiment. A plurality of switches (a first switch SW1 to a sixth switch SW6) is included in a route (the bias wiring 23) from the bias circuit 22 to the plurality of output buffers 21. The bias wiring 23 includes bias wirings 23-0 to 23-8. The bias wiring 23-0 connects the bias circuit 22 and both of the first and sixth switches SW1 and SW6 through nodes N1 and N2, respectively. The bias wiring 23-1 connects the node N1 to the output buffers 21-1 to 21-342 through bias signal control circuits 36-1 to 36-342, respectively. The bias wiring 23-2 connects the first and second switches SW1 and SW2 to the output buffers 21-343 to 21-360 through bias signal control circuits 36-343 to 36-360, respectively. The bias wiring 23-3 connects the second and third switches SW2 and SW3 to the output buffers 21-361 to 21-384 through bias signal control circuits 36-360 to 36-384, respectively. The bias wiring 23-4 connects the third switch SW3 and the bias circuits 22 to the output buffers 21-385 to 21-402 through bias signal control circuits 36-385 to 36-402, respectively. The bias wiring 23-5 connects the bias circuit 22 and the fourth switch SW4 to the output buffers 21-403 to 21-420 through bias signal control circuits 36-403 to 36-420, respectively. The bias wiring 23-6 connects the fourth and fifth switches SW4 and SW5 to the output buffers 21-421 to 21-444 through bias signal control circuits 36-421 to 36-444, respectively. The bias wiring 23-7 connects the fifth and sixth switches SW5 and SW6 to the output buffers 21-445 to 21-462 through bias signal control circuits 36-445 to 36-462, respectively. The bias wiring 23-8 connects the node N2 to the output buffers 21-463 to 21-804 through bias signal control circuits 36-463 to 36-804, respectively. Here, the bias signal control circuits 36 (36-1 to 36-804) are described later. Preferably, each bias wiring may be arranged as one line in a chip layout. Preferably, each of the plurality of switches is provided with a transfer gate and the like. In the following embodiment, a case is exemplified in which the data line driving circuit 2 has a function for variably setting 4 kinds of output numbers. Incidentally, in this configuration, the output number of the data line driving circuit 2 in this embodiment is not limited. Preferably, the bias circuit 22 is provided near the center of the chip of the data line driving circuit 2 and has a function for stopping an operation of the output buffer 21 near the center of the output column.

Here, the bias signal control circuits 36-1 to 36-342 maybe replaced with less than 342 or one bias signal control circuit 36. Similarly, the bias signal control circuits 36-343 to 36-360 may be replaced with less than 18 or one bias signal control circuit 36. The bias signal control circuits 36-361 to 36-384 may be replaced with less than 24 or one bias signal control circuit 36. The bias signal control circuits 36-385 to 36-402 may be replaced with less than 18 or one bias signal control circuit 36. The bias signal control circuits 36-403 to 36-420 may be replaced with less than 18 or one bias signal control circuit 36. The bias signal control circuits 36-421 to 36-444 may be replaced with less than 24 or one bias signal control circuit 36. The bias signal control circuits 36-445 to 36-462 may be replaced with less than 18 or one bias signal control circuit 36. The bias signal control circuits 36-463 to 36-804 may be replaced with less than 342 or one bias signal control circuit 36.

FIG. 5 is a table exemplifying a relation between states of the first switch SW1 to the sixth switch SW6 and the output numbers. As shown in the table in FIG. 5, by switching the ON/OFF states of the plurality of switches (the first switch SW1 to the sixth switch SW6), it is possible to attain the various kinds of the output numbers (684 to 804).

Again in FIG. 4, the bias wiring 23-0 in this embodiment is arranged from the bias circuit 22 to both of the first and sixth switches SW1 and SW6, respectively. Here, the first and sixth switches SW1 and SW6 are provided at boundaries between the left and right side portions and the other portions. In the left and right side portions, the number of output number switching actions is the smallest rather than the other portions. Specifically, the bias wirings 23-0 and 23-1 directly connect the bias circuit 22 to the output buffers 21-1 to 21-342. Also, the bias wirings 23-0 and 23-8 directly connect the bias circuit 22 to the output buffers 21-463 to 21-804. The expression of "directly connect" means "not connect through the switch". The data line driving circuit 2 in this embodiment is configured such that the outputs from the output buffers 21 ahead of the boundaries (towards outside the IC) are fixed. Thus, the bias wiring 23-0 is connected to the respective output buffers 21-1 to 21-342 and 21-463 to 21-804 ahead of the boundaries.

In the case of the output buffers 21 located inside the foregoing boundaries, namely the output buffers 21-343 to 21-462, there are the switches (the first switch SW1 to the sixth switch SW6) for controlling connections of the bias wirings 23-1 to 23-8 for execution of the various switching actions. The first switch SW1 switches on and off based on a first non-inversion signal TEST1 and a first inversion signal TEST1B. The second switch SW2 switches on and off based on a second non-inversion signal TEST2 and a second inversion signal TEST2B. The third switch SW3 switches on and off based on a third non-inversion signal TEST3 and a third inversion signal TEST3B. The fourth switch SW4 switches on and off based on a fourth non-inversion signal TEST4 and a fourth inversion signal TEST4B. The fifth switch SW5 switches on and off based on a fifth non-inversion signal TEST5 and a fifth inversion signal TEST5B. The sixth switch SW6 switches on and off based on a sixth non-inversion signal TEST6 and a sixth inversion signal TEST6B. These non-inversion signals TEST1 to TEST6 and inversion signals TEST1B to TEST6B are supplied from the control circuit 5.

Here, the inversion signal TESTnB (n=1 to 6) is an inverted signal of the non-inversion signal TESTn, and therefore, a set of the inversion signal TESTnB and the non-inversion signal TESTn can be assumed as one control signal.

The bias wiring 23 connected to the output buffers 21 is wired up to the end of the maximal output (the output buffer 21-1 to 21-342 and 21-463 to 21-804). Then, the bias wiring 23 of the output inside the maximal output is wired through the switches (switches SW1 to SW6), and the output number is changed based on the control signal (non-inversion signals TEST1 to TEST6 and inversion signals TEST1B to TEST6B) supplied by the control circuit 5. Also, when the output number is changed, the bias circuit 22 fixes a voltage of the bias wiring 23 connected to the bias signal control circuits 36 whose operation is stopped and consequently stops supplying the electric current to the corresponding output buffer 21. Here, the signal for controlling the plurality of switches (the first switch SW1 to the sixth switch SW6) is preferred to be used, when the electric current to the output buffer 21 is stopped (cut).

Here, the bias wirings 23 may be preferably arranged in symmetry with respect to a line passing through the bias circuit 22 and parallel to the plurality of data lines 6. The plurality of switches may be preferably arranged in symmetry with respect to the line. More preferably, the line may pass through the middle of the bias circuit 23.

Figure 6:
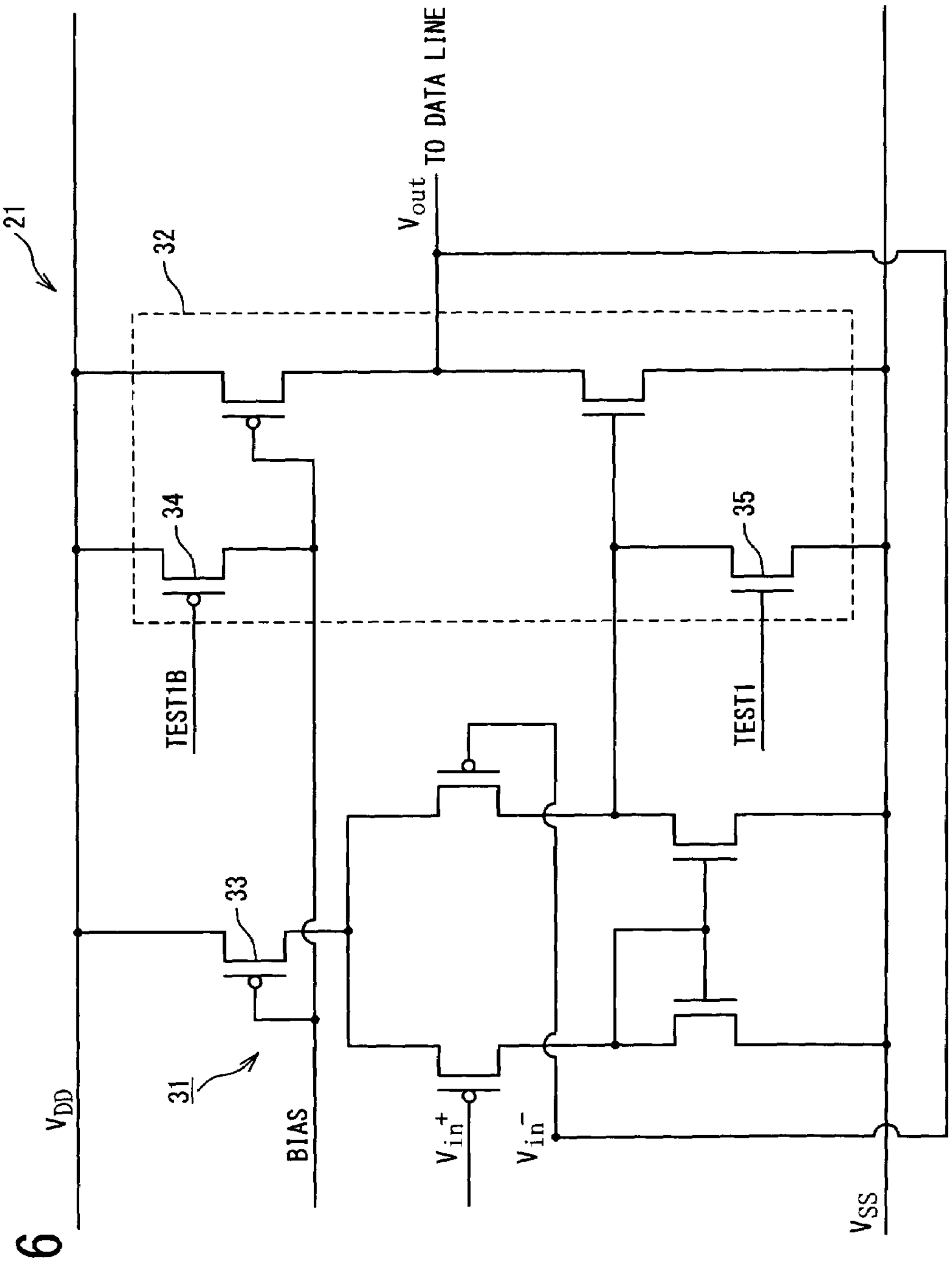
FIG. 6 is a circuit diagram exemplifying a configuration of an output buffer in the embodiment.

FIG. 6 is a circuit diagram exemplifying a configuration of the output buffer 21 in this embodiment. The output buffer 21 includes an amplifying stage 31 and an output stage 32. Incidentally, this embodiment is exemplified with regard to a case in which transistors for receiving the input signals ($Vin^+$, $Vin^-$) of the amplifying stage 31 are P-channel transistors. Incidentally, the configuration of the output buffer 21 in this embodiment is not limited to the circuit configuration shown in FIG. 6. Also, the output buffer 21 shown in FIG. 6 exemplifies a circuit whose operation is stopped based on the state of the first switch SW1.

With reference to FIG. 6, the amplifying stage 31 in the output buffer 21 includes an electric current source 33. The electric current source 33 supplies a predetermined electric current to an input stage and a current mirror circuit, in response to a bias signal BIAS applied to the gate electrode from the bias circuit 22 through the bias signal control circuits 36. In this embodiment, as described later, a power source line voltage VDD as the bias signal BIAS is supplied to the output buffer 21 whose operation is stopped. Thus, when the switch between the bias circuit 22 and the output buffer 21 on the bias wiring 23 is turned off, simultaneously with this, the electric current source 33 in the output buffer 21 connected to the bias wiring 23 cuts the steady-state electric current of the output buffer 21.

Also, with reference to FIG. 6, the output stage 32 includes a first output control circuit 34 and a second output control circuit 35. The first inversion signal TEST1B is supplied to the gate electrode of the first output control circuit 34, and the first non-inversion signal TEST1 is supplied to the gate electrode of the second output control circuit 35. The first non-inversion signal TEST1 and the first inversion signal TEST1B are the signals for controlling the first switch SW1 supplied by the control circuit 5. Since the first non-inversion signal TEST1 is set at a High level and the first inversion signal TEST1B is set at a Low level, the "Vout" of the output buffer 21 becomes Hi-Z (High Impedance).

On the other hand, the bias signal BIAS itself outputted by the bias circuit 22 is supplied to the output buffer 21 whose operation is not stopped. Thus, when the switch between the bias circuit 22 and the output buffer 21 on the bias wiring 23 is on, the electric current source 33 supplies the steady-state electric current of the output buffer 21. In this case, the first non-inversion signal TEST1 is set at a Low level and the first inversion signal TEST1B is set at a High level, and the "Vout" based on the input signals ($Vin^+$, $Vin^-$) is outputted to the data line 6.

Figure 7:
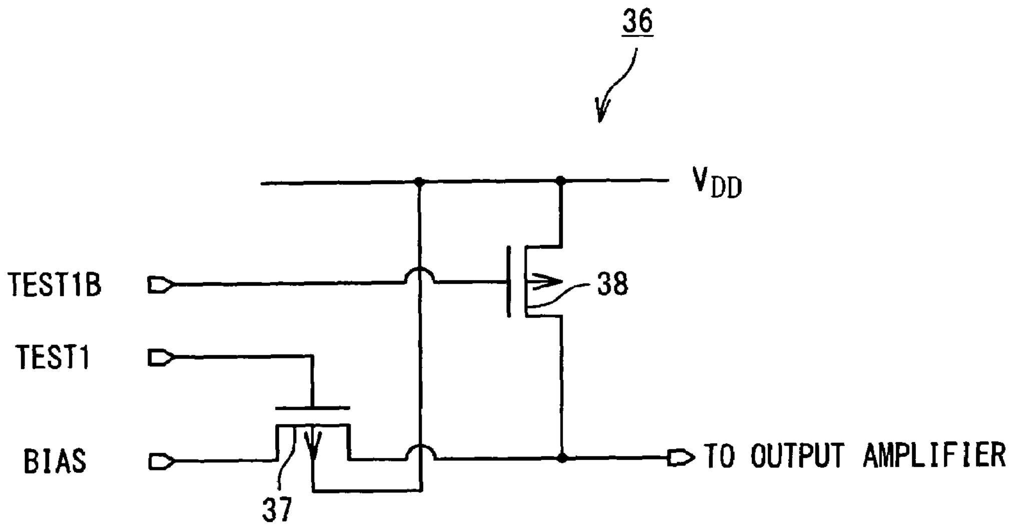
FIG. 7 is a circuit diagram exemplifying a configuration of a bias signal control circuit.

FIG. 7 is a circuit diagram exemplifying a configuration of the bias signal control circuit 36 in this embodiment. The bias signal control circuit 36 is placed at the former stage of the output buffer 21. That is, the bias signal control circuit 36 is placed between the bias circuit 22 and the output buffer 21 through the bias wiring 23. The bias signal BIAS is supplied from the bias circuit 22. When stopping the operation of the electric current source 33 in the output buffer 21, the bias signal control circuit 36 sets the bias signal BIAS to the power source voltage or the ground (earth voltage) by, for example, connecting the bias wiring 23 to the power source voltage of the driver or the ground (earth voltage). The bias signal control circuit 36, by setting the bias wiring 23 to the power source voltage of the driver or the ground (earth voltage), stops (or forbids) the operation of the electric current source 33 in the output buffer 21 connected to the bias wiring 23 at the gate.

For example, since the control circuit 5 sets the first non-inversion signal TEST1 to the High level and sets the first inversion signal TEST1B to the Low level, a first transistor 37 is deactivated and a second transistor 38 is activated in the bias signal control circuit 36. Therefore, in the bias signal control circuit 36, the bias wiring 23, to which the "BIAS" is supplied, is connected to the power source voltage VDD. It is also considered that the bias signal itself supplied by the bias circuit 22 is stopped and replaced with the power source voltage VDD.

On the other hand, when not stopping the operation of the electric current source 33 in the output buffer 21, the control circuit 5 sets the first non-inversion signal TEST1 to the Low level and sets the first inversion signal TEST1B to the High level.

Figure 8:
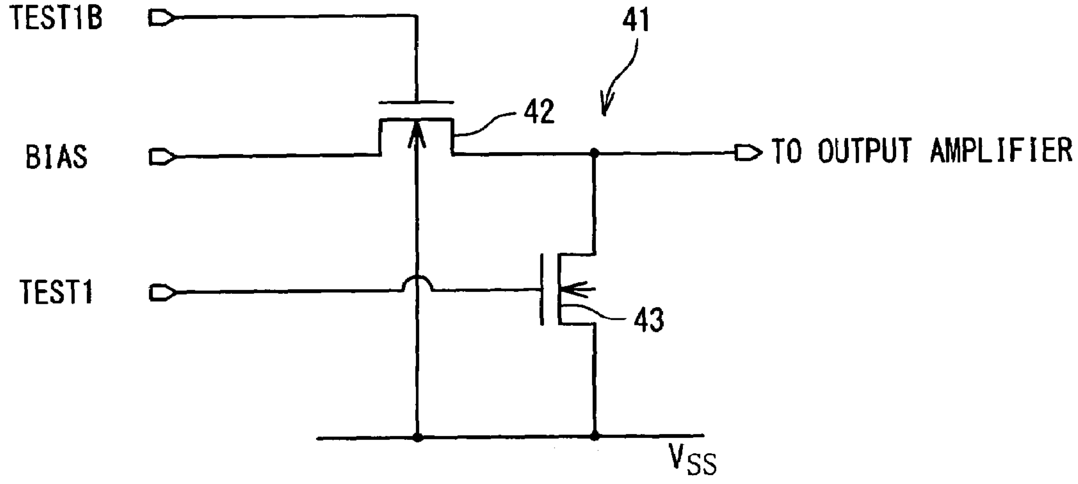
FIG. 8 is a circuit diagram exemplifying a configuration of a bias signal control circuit.

FIG. 8 is a circuit diagram exemplifying another configuration of the bias signal control circuit in this embodiment. The bias signal control circuit 41 in FIG. 8 is suitable for a case in which the transistors for receiving the input signals ($Vin^+$, $Vin^-$) are N-channel transistors in the amplifying stage 31 in the output buffer 21 shown in FIG. 6. When the control circuit 5 sets the first non-inversion signal TEST1 to the High level and sets the first inversion signal TEST1B to the Low level, a third transistor 42 is deactivated and a fourth transistor 43 is activated in the bias signal control circuit 41. Therefore, in the bias signal control circuit 41, the bias wiring 23, to which the "BIAS" is supplied, is connected to the VSS, and the electric current does not flow through the output buffer 21.

As mentioned above, the data line driving circuit 2 in this embodiment sets the transistor in the output stage of the output buffer 21 (AMP) whose operation is stopped to the Hi-Z state and also cuts the electric current based on the bias signal for controlling the constant electric current source of the output buffer 21 (AMP). Thus, the data line driving circuit 2 cuts the electric current to the output buffer 21 whose operation is stopped, among the output buffers 21 in the output amplifier 19. In this way, in the data line driving circuit 2 in this embodiment, the switch can be used to switch the bias wirings, without using any complex circuit configuration. Then, since the electric current in the outputs that becomes unnecessary at that time can be cut, the reduction in the electric current consumption can be attained.

This configuration enables the suppress in the electric current consumption of the output buffer 21 whose operation is stopped, by using the output switching, without any increase in the area on the layout of the bias wiring 23.

According to the present invention, it is possible to provide the driver circuit including the configuration in which the output numbers can be properly switched.

Also, according to the present invention, it is possible to provide the driver circuit including the configuration which can properly stop supplying the electric current to the outputs whose operation are stopped because the output numbers are switched.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. A circuit, comprising:

a plurality of output circuits each configured to output a data voltage supplied when a bias power is supplied;

a bias circuit configured to generate the bias power;

a bias wiring coupled to the bias circuit to supply the bias power to the output circuits; and a plurality of switches configured to cut off the bias power to at least a portion of bias wiring in response to a control signal, the plurality of switches being in series on the bias wiring, wherein at least a portion of the bias wiring is coupled to at least one of the output circuits to supply the bias power, wherein said bias wiring is configured such that a first one of the plurality of output circuits is directly connected to the bias circuit via the bias wiring and a bias signal control circuit without one of the plurality of switches being provided therebetween, and wherein respective ones of the plurality of switches and the plurality of output circuits are provided on the bias wiring in an alternating order from the bias circuit.

2. The circuit according to claim 1, wherein the circuit is configured to change an output number of the data voltage in response to the control signal.

3. The circuit according to claim 1, wherein a last one of the plurality of output circuits is directly connected to the bias circuit via another one of the bias wiring and another bias signal control circuit without one of the plurality of switches being provided therebetween, and wherein the first one of the plurality of output circuits and the last one of the plurality of switches are provided at boundaries between a left side portion and a right side portion and other ones of the plurality of output circuits.

4. A driver circuit, comprising:

a data line driving circuit configured to drive a plurality of data lines arranged in a display panel, wherein said data line driving circuit includes a plurality of output circuits, each configured to include an electric current source which supplies electric current in response to a bias voltage and to supply a data voltage by using said electric current to a corresponding one of said plurality of data lines;

a bias circuit configured to generate said bias voltage and to supply said bias voltage to said plurality of output circuits through bias wirings; and a plurality of switches configured to be provided between said bias circuit and said plurality of output circuits and to cut off said bias wirings in response to a control signal, the plurality of switches being in series on the bias wiring, wherein said bias wirings are arranged to change an output number of the driver circuit based on which ones of said plurality of switches are cut off, wherein said bias wirings are configured such that a first one of the plurality of output circuits is directly connected to the bias circuit via a one of the bias wirings and a bias signal control circuit without one of the plurality of switches being provided therebetween, and wherein respective ones of the plurality of switches and the plurality of output circuits are provided on the bias wirings in an alternating order from the bias circuit.

5. The driver circuit according to claim 4, wherein said data line driving circuit is configured to change said output number in response to a setting signal, and wherein said plurality of switches is arranged at boundaries between first output circuits which are not used and second output circuits which are used in said plurality of output circuits when said output number is changed.

6. The driver circuit according to claim 4, wherein said plurality of switches cuts off said bias wirings such that said bias voltage is not supplied to said first output circuits.

7. The driver circuit according to claim 6, wherein another signal is supplied to said first output circuits such that steady-state electric current does not flow in said first output circuits.

8. The driver circuit according to claim 4, wherein said bias wirings are arranged in a one line in a chip layout.

9. The driver circuit according to claim 4, wherein each output circuit of said plurality of output circuits comprises:

an output terminal configured to be connected to a corresponding one of said plurality of data lines; and an output control circuit configured to control a state of said output terminal to be in a high-impedance state in response to said control signal.

10. The driver circuit according to claim 4, wherein said data line driving circuit further comprises a bias control circuit configured to stop supplying said bias voltage at said bias circuit, wherein said bias control circuit outputs a current stopping signal to said electric current source in response to said control signal, and wherein said electric current source stops supplying said electric current in response to said current stopping signal.

11. The driver circuit according to claim 4, wherein each switch of said plurality of switches comprises a transfer gate which opens and closes in response to said control signal.

12. The driver circuit according to claim 4, wherein said bias wirings are arranged in symmetry with respect to a line passing through said bias circuit and parallel to said plurality of data lines, and wherein said plurality of switches are arranged in symmetry with respect to said line.

13. A display apparatus comprising:

a display panel configured to include a plurality of pixels arranged in a matrix shape; and a data line driving circuit configured to drive a plurality of data lines arranged in said display panel, wherein said data line driving circuit includes:

a plurality of output circuits each configured to include an electric current source which supplies electric current in response to a bias voltage and to supply a data voltage by using said electric current to a corresponding one of said plurality of data lines;

a bias circuit configured to generate said bias voltage and to supply said bias voltage to said plurality of output circuits through bias wirings; and a plurality of switches configured to be provided between said bias circuit and said plurality of output circuits and to cut off said bias wirings in response to a control signal, the plurality of switches being in series on the bias wiring, wherein said bias wirings are arranged to change an output number of the data line driving circuit based on which ones of said plurality of switches are cut off, wherein said bias wirings are configured such that a first one of the plurality of output circuits is directly connected to the bias circuit via a one of the bias wirings and a bias signal control circuit without one of the plurality of switches being provided therebetween, and wherein respective ones of the plurality of switches and the plurality of output circuits are provided on the bias wirings in an alternating order from the bias circuit.

14. The display apparatus according to claim 13, wherein each of said plurality of output circuits includes:

an output terminal configured to be connected to a corresponding one of said plurality of data lines; and an output control circuit configured to control a state of said output terminal to be in a high-impedance state in response to said control signal.

15. The display apparatus according to claim 13, wherein said data line driving circuit further includes a bias control circuit configured to stop supplying said bias voltage at said bias circuit, wherein said bias control circuit stops an operation of said electric current source in response to said control signal.

16. The display apparatus according to claim 13, wherein said control signal is outputted by a control circuit which controls drive timings of said plurality of data lines, and wherein each switch of said plurality of switches comprises a transfer gate which opens and closes in response to said control signal.

17. The display apparatus according to claim 13, wherein said bias wirings are arranged in symmetry with respect to a line passing through said bias circuit and parallel to said plurality of data lines, and wherein said plurality of switches are arranged in symmetry with respect to said line.

* * * * *